(12) United States Patent
Ishida

(10) Patent No.: US 7,664,567 B2
(45) Date of Patent: Feb. 16, 2010

(54) WAREHOUSE SYSTEM

(75) Inventor: Masato Ishida, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 0 days.

(21) Appl. No.: 11/792,072

(22) PCT Filed: Dec. 1, 2005

(86) PCT No.: PCT/JP2005/022074

§ 371 (c)(1),
(2), (4) Date: Jun. 1, 2007

(87) PCT Pub. No.: WO2006/059677

PCT Pub. Date: Jun. 8, 2006

(65) Prior Publication Data

US 2008/0051931 A1 Feb. 28, 2008

(30) Foreign Application Priority Data

Dec. 2, 2004 (JP) .................. 2004-350203

(51) Int. Cl.
*G06F 7/00* (2006.01)
(52) U.S. Cl. ................................... 700/215; 700/214
(58) Field of Classification Search ............ 700/213, 700/214, 215, 216, 221, 224, 225, 227; 414/280; 235/472.01
See application file for complete search history.

(56) References Cited

U.S. PATENT DOCUMENTS

| 6,010,239 | A | * | 1/2000 | Hardgrave et al. | .......... 700/213 |
| 6,123,259 | A | * | 9/2000 | Ogasawara | ................. 235/380 |
| 6,600,418 | B2 | * | 7/2003 | Francis et al. | ........... 340/572.1 |
| 7,336,177 | B2 | * | 2/2008 | Onderko et al. | .......... 340/572.1 |
| 2004/0206827 | A1 | * | 10/2004 | Silverbrook et al. | ... 235/472.01 |
| 2005/0199716 | A1 | * | 9/2005 | Shafer et al. | ................. 235/385 |

FOREIGN PATENT DOCUMENTS

| JP | 6-166408 A | 6/1994 |
| JP | 2000-233833 A | 8/2000 |
| JP | 2003-84669 A | 3/2003 |

OTHER PUBLICATIONS

International Search Report of PCT/JP2005/022074, date of mailing Jan. 24, 2006.

* cited by examiner

*Primary Examiner*—Gene Crawford
*Assistant Examiner*—Ramya Prakasam
(74) *Attorney, Agent, or Firm*—Westerman, Hattori, Daniels & Adrian, LLP

(57) ABSTRACT

When an article is taken out from an automatic warehouse (6), value information is written in an unmodifiable manner into an ID tag fitted to the article. When the value information is needed to know, the value information is read from the ID tag (30) of the article (28) by an ID reader (24). The amount of refund when an article is returned and the amount of compensation when an article is broken can be objectively known.

6 Claims, 2 Drawing Sheets

| Code identifier | Tag No. | Shipping slip No. | Value information |
|---|---|---|---|

30

| Manufacturer name | Price | Sales condition |
|---|---|---|

| Store name | Price | Sales condition |
|---|---|---|

| Code identifier | Tag No. | Manufacturer field | Store field |
|---|---|---|---|

50

WAREHOUSE SYSTEM

TECHNICAL FIELD

The present invention relates to a system that uses warehouses such as automated warehouses.

BACKGROUND ART

When articles are returned, problems occur in settlement (refund) transaction. For example, as in the case of the apparel industry, in the case where commission sale of articles is admitted, and the price such as the wholesale price changes depending on the time of year, from the beginning to the latter half of the season, in the absence of objective information as to the time and the price of the article, when the article is returned, the settlement transaction is complicated. For example, in the case where articles were sold to the same buyer a plurality of times, at different prices in one season, even if shipment slips are presented, it is dubious that the articles were sold at the prices indicated on the slips. Further, if a third person who bought articles from a reseller returns the articles for requesting a refund, the situation is further complicated. In the industry where commission sale is widely admitted, the seller may accept return of articles from a person other than the direct buyer. Under the circumstances, unique IDs may be assigned to the articles. In this approach, database searches are conducted using the IDs to determine the sales prices. However, in the environment where connection to the database is not available, such an approach cannot be adopted.

The similar problems may occur, e.g., in the industry of nonlife insurance. If an article of which the acquisition price is not certain is damaged, a trouble may occur. For example, in the case of a relatively expensive article, if the price of the article differs depending on the place, the time, or the route of the sale, it is difficult to compensate for the damage of the article in a manner reasonable to both of the insurance company and the client of the insurance company.

DISCLOSURE OF THE INVENTION

Problems to be Solved by the Invention

An object of the present invention is to make it possible to objectively identify the price of an article at the time of making a refund when the article is returned, or at the time of making a compensation when the article is damaged or broken.

Another object of the present invention is to make it possible to reliably write value information of each article, in the case where a plurality of articles are stored in a carrier, and individual articles are transported from the carrier.

Means for Solving the Problems

According to the present invention, a warehouse system stores an article having an ID tag in a warehouse, and has an ID writer for writing value information of the article in the ID tag at the time of retrieving the article from the warehouse.

Further, according to the present invention, a warehouse system stores an article having an ID tag in a warehouse, and has an ID writer for writing return information of the article in the ID tag at the time of retrieving the article from the warehouse.

Preferably, the value information is a price of the article.

Preferably, the return information is return policy of the article.

Further, preferably, the value information or the return information can be written in the ID tag one time only.

In particular, preferably, the warehouse stores a plurality of articles set in a carrier, and has means for transporting individual articles from the carrier by picking the articles using a head having the ID writer.

ADVANTAGES OF THE INVENTION

According to the present invention, value information or return information of the article is written in the ID tag of the article. Therefore, at the time of returning the article, or at the time of making compensation when the article is damaged or broken, the value of the article and the return policy of the article become clear. For example, by writing the value information of the article, it is possible to objectively evaluate the amount of refund when the article is returned, or the amount of compensation when the article is damaged or broken. Further, if the return policy, e.g., whether return of the article is acceptable or not, and the amount of refund when the article is returned are written, the transaction when the article is returned can be carried out objectively in a manner reasonable to both of the seller and the person who returned the article.

In particular, as the value information and the return information, if the price of the article such as the sales price is written in the ID tag, even if the price of the article changes, or even if the article is returned through a third person, it is possible to objectively make a refund for the returned article.

If the price information or return information can be written in the ID tag one time only, it is possible to prevent forgery after the article is retrieved from the warehouse of the warehouse system.

If an ID writer is attached to a head for picking individual articles from the carrier, it is possible to reliably write value information and return information in the ID tag at the time of picking the article, and such information is not erroneously written in the ID tag of another article.

DESCRIPTION OF THE NUMERALS

Figure 1:
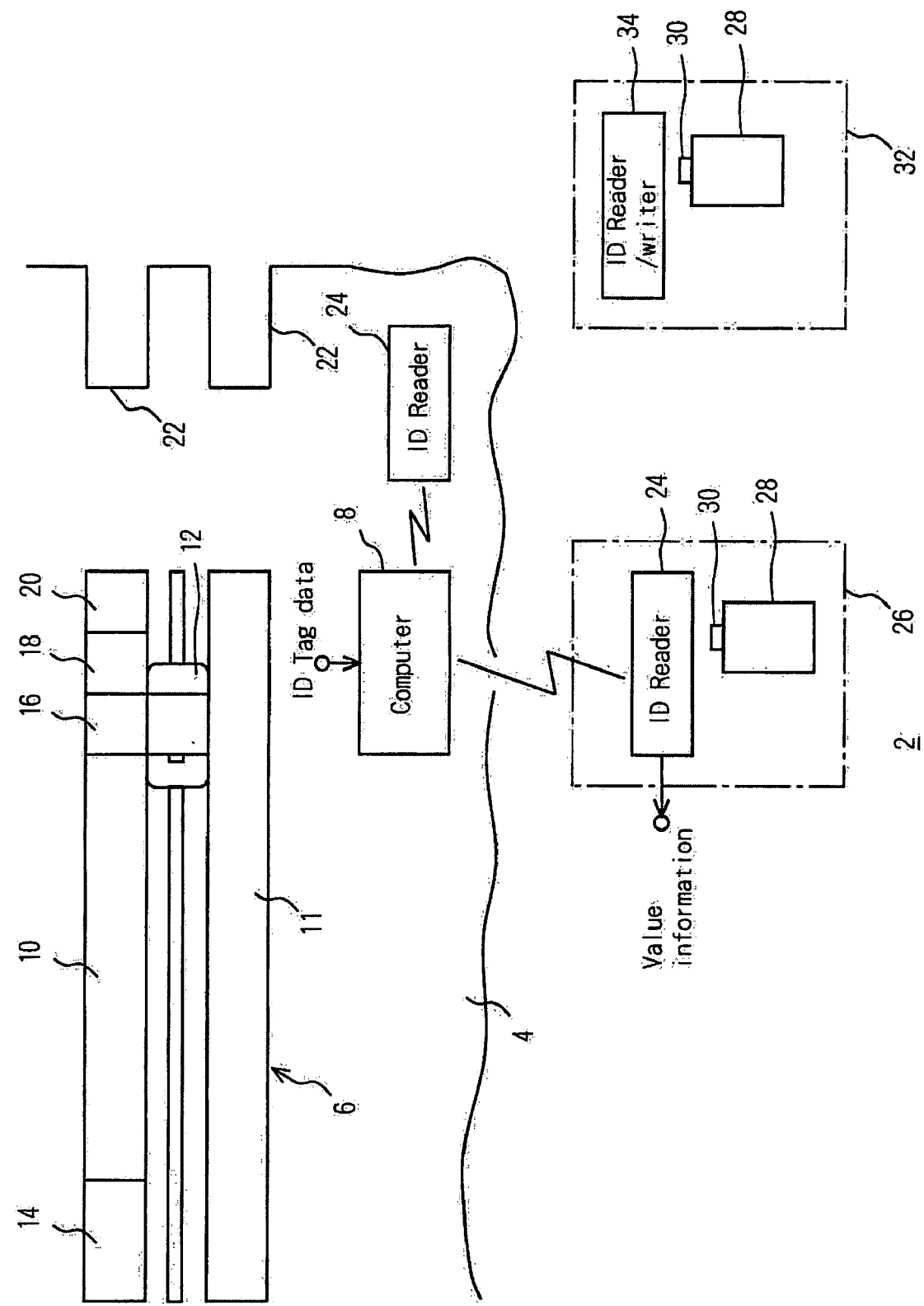
FIG. 1 is a diagram schematically showing a distribution system using an automated warehouse system according to an embodiment.

2: distribution system
4: delivery center
6: automated warehouse
8: computer
10, 11: rack
12: stacker crane
14: storage station
16: picking station
18: picking apparatus
20: sub-conveyor
22: truck berth
24: ID reader
26: business office 28: article
30, 50: ID tag
32: store
34: ID reader/writer
36: cylinder
38: suction head
40: ID writer
42: bucket
44: tray

EMBODIMENT

FIGS. 1 to 4 show a warehouse system according to the embodiment in a case of a distribution system 2 for a manufacturer or a wholesale store as an example. A reference numeral 4 denotes a delivery center having a warehouse such as an automated warehouse or a floor warehouse. The delivery center 4 is a base of distribution. A reference numeral 6 is an automated warehouse as a central part of the delivery center 4. A reference numeral 8 denotes a computer storing data handled in the delivery center 4. For example, a pair of left and right racks 10, 11 are provided in the automated warehouse 6. A stacker crane 12 has means for transportation in the warehouse, and transports articles in units of carriers such as buckets, pallets, or trays. An ID tag such as an RFID tag is attached to each of the articles. A reference numeral 14 denotes a storage station, and a reference numeral 16 denotes a picking station. A picking apparatus 18 is provided at the picking station 16 for making it possible to pick up articles one by one. A reference numeral 20 denotes a sub-conveyor provided on an outlet side of the picking apparatus 18. Reference numerals 22 denote truck berths, and reference numerals 24 denote ID readers. If any article is returned to the delivery center 4, the ID reader 24 reads an ID tag of the returned article. The type of the automated warehouse can be determined arbitrarily.

A reference numeral 26 denotes a business office. The business office 26 and the delivery center 4 belong to the same company or the same group. The ID reader 24 reads value information and return information from the ID tag 30 of the returned article 28. A reference numeral 32 denotes a store. The store 32 may be any of a wholesale store, a retail store, an office of mail order, and a mass merchandizing store. The store 32 has an ID reader/writer 34, or simply has an ID reader. In the case where the store 32 has the ID reader/writer 34, preferably, before selling the article delivered from the delivery center 4 to a third person, the ID reader/writer 34 writes the name of the store 32, the sales date, the wholesale price, return information, or the like. Further, when any article is returned, the ID reader/writer 34 reads information written in the store 32, or information written in the delivery center 4, from the ID tag 30.

Figures 2, 3, 4:
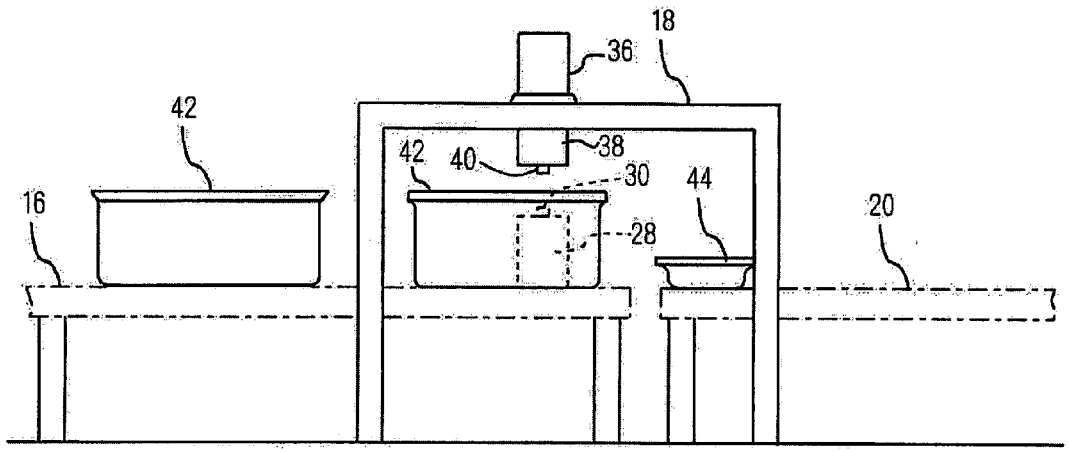
FIG. 2 is a view showing a state where picking of an article and writing of data in an ID tag are performed.
FIG. 3 is a diagram showing data structure of the ID tag according to the embodiment.
FIG. 4 is a diagram showing data structure of the ID tag according to a modified embodiment.

FIG. 2 shows structure of the picking apparatus 18. Articles are retrieved from the warehouse to the picking station 36, and transported to the picking apparatus 18 by the conveyor of the picking station 16, in units of buckets 42 or the like. A reference numeral 36 denotes a cylinder for elevating/lowering a suction head 38. The cylinder 36 is movable in the XY direction relative to the picking apparatus 18. For example, an ID writer 40 is provided at a lower position of the suction head 38. The articles 28 are taken out from the bucket 42 by sucking operation of the suction head 38 one by one. At this time, value information and return information are written in the ID tag 30 by the ID writer 40, and the article 28 is transferred to a tray 44 by the suction head 38. The structure of the picking apparatus 18 can be determined arbitrarily. It is not essential to move the picking apparatus 18 in the respective X, Y, Z direction using separate actuators. Alternatively, for example, the head is supported by three inclined shafts, and the inclined shafts are expanded/retracted to transfer the article. Further, for holding the article, instead of sucking the article by vacuum suction or the like, a suitable chuck mechanism may be used. Importantly, a head for allowing the articles one by one from a carrier such as the bucket 42 is provided, and the head has an ID writer.

FIG. 3 shows an example of the ID tag 30. For example, the ID tag according to the embodiment is an RFID tag. Though the shape and the type of the ID tag can be determined arbitrarily, preferably, the ID tag is attached to a package or a case of an apparel article, a sundry article, a gift, food, or the like, or attached to the article itself. The ID tag 30 or the like is configured such that information can be written in each field of the ID tag 30 one time only, or a security measure is taken to ensure that persons without certain authorization of the delivery center or the store cannot write value information or return information of the article. A code identifier indicating an ID tag type, and an ID tag number are written in the ID tag 30 of FIG. 3. Further, preferably, a shipping slip number and value information are written in the ID tag 30. The value information is the wholesale price at the time of shipping the article from the delivery center 4. Further, return information indicating whether the article can be returned or not, and the policy of accepting the returned article may be written in the ID tag 30. The shipping slip number is written in the ID tag 30 because it is difficult to writhe all of the sales conditions in the ID tag 30. By referring to the shipping slip number using the computer 8 or the like, sales conditions other than the value information and the return information can be retrieved. It is not essential to write the shipping slip number.

An ID tag 50 of FIG. 4 has a manufacturer field and a store field. For example, the name of the manufacturer, the wholesale price, and the sales condition such as whether the article can be returned or not are written in the manufacturer field. The ID writer of the store is used for writing information in the store field. For example, the name of the store, the price, and the sales condition such as the return policy are written in the store field.

Operation according to the embodiment will be described. In the delivery center 4, at the time of shipping the articles, the articles are taken out from the bucket 42 one by one using the picking apparatus 18. At this time, the ID writer is used for writing the shipping slip number, the value-information or return policy in the ID tag of the article. Writing can be performed only one time, and no modifications can be made. Otherwise, a security measure is taken to detect modification of the information. In the case of providing the ID tag 50 in FIG. 4, the store that purchases the article from the delivery center 4, and handles the article also writes information such as the price and return policy in the ID tag. In any of the case of the ID tag 30 in FIG. 3, and the case of the ID tag 50 in FIG. 4, it is preferable that writing can be performed only one time in each field of the return information, the price, and the sales condition. For this purpose, for example, a bit indicating the presence of writing or a switch used for writing should be provided for each field. In each field, at the time of writing information for the first time, the bit of the field should be set, or the switch of the field should be cut off to prevent the subsequent writing. Otherwise, the value information or the return information in terms of the price may be rewritable only from the higher price to the lower price in a manner that value information or return information of the price higher than the price at the time of retrieval of the article from the warehouse cannot be written. Likewise, the limitation such as the deadline of returning the article may be rewritable only in the case where the limitation becomes stricter.

It is assumed that an article is distributed by reselling, and a request to return the article is made to the store 32 or the business office 26. In the embodiment, since information such as the wholesale price is non-rewritably written in the ID tag, or written in a manner that rewriting of information can be detected, no dispute will not occur as to what price is used when the article was sold. Further, if the article was sold under the return policy where no return is acceptable or the deadline of returning the article is limited, by writing such information, no troubles occur as to whether the article can be returned or not. If the article is covered by the nonlife insurance, for example, by writing information such as the sales price and the sales date in the ID tag at the store, the damage of the article can be compensated in a manner reasonable to both of the insurance company and the client of the insurance company.

In the embodiment, the automated warehouse 6 is used. Alternately, a floor warehouse may be used. The value information or the return information may be written in the ID tag at the time of shipping the article from the delivery center 4.

The invention claimed is:

1. A distribution system for a warehouse, comprising:
    an article that is stored in the warehouse, the article having an ID tag;
    a carrier in which the article having the ID tag is placed at a time of retrieving the article from the warehouse;
    a carrier transporting apparatus to transport within the warehouse the carrier in which the article having the ID tag is placed; and
    an article transporting device to transport the article from the carrier, the article transporting device including a head for picking up the article from the carrier, the head having an ID writer,
    wherein the head picks up the article from the carrier and, at the time of picking up the article from the carrier, the ID writer writes a sales condition of the article in the ID tag.

2. The distribution system according to claim 1, wherein the sales condition is value information of the article.

3. The distribution system according to claim 1, wherein the sales condition is return information of the article.

4. The distribution system according to claim 1, wherein the sales condition can be written into the ID tag only one time.

5. The distribution system according to claim 4, wherein the ID tag has a field where the sales condition can be written one time only at the time of retrieving the article from the warehouse, and another field where the sales condition of the article in a store to which the article is transported from the warehouse can be written one time only in the store.

6. The distribution system according to claim 1, further comprising an ID reader for reading the sates condition from the ID tag at a time of settlement for the article.

* * * * *